INVENTOR.
VLADIMIR H. PAVLECKA
BY
Nicholas T Volk
ATTORNEY.

INVENTOR.
VLADIMIR H. PAVLECKA

United States Patent Office 3,037,352
Patented June 5, 1962

3,037,352
BYPASS JET ENGINES USING CENTRIPETAL FLOW COMPRESSORS AND CENTRIFUGAL FLOW TURBINES
Vladimir H. Pavlecka, 1176 Monument St., Pacific Palisades, Calif.
Filed Sept. 8, 1958, Ser. No. 759,625
11 Claims. (Cl. 60—39.35)

This invention relates to bypass jet engines in which a portion of compressed air bypasses the combustion chamber through a bypass compressors and enters a jet stream upon leaving the bypass compressor.

Bypass engines have gained acceptance for propelling aircraft since the propulsive efficiency of the jet stream is a function not only of the velocity, but also of the temperature of the jet stream. Generally, the temperature of the jet stream leaving the compressor turbine is higher than one would wish to have for obtaining a reasonable propulsive efficiency. Two methods are used for raising such propulsive efficiency. One method is to convert the heat energy of gases into higher pressure obtained on the output side of the compressor, and the second method is to use some of the heat energy contained in the gases leaving the combustion chamber for operating a bypass compressor. The latter method not only decreases the temperature of the jet, but it also increases its specific flow. It is known that propulsive efficiency is maximum when the weight flow of gases leaving the compressor turbine is equal to the weight flow of air through the bypass compressor. Therefore, the best propulsive efficiency is obtainable with a 50–50 division of the weight flows through the turbine and the bypass compressor.

The invention discloses a bypass jet power plant using a multi-stage centripetal flow main compressor, a toroidal combustion chamber and a centrifugal flow gas turbine. The turbine operates the main compressor as well as the bypass compressor which includes a centripetal flow portion as well as the centrifugal flow portion.

Several versions of the power plant of the above type are disclosed in the drawings, some power plants having two rotors while the other plants have a plurality of rotors. All power plants are contra-rotating power plants in which the first rotor rotates in one direction, the next rotor rotates in the opposite direction, and the third rotor, if there is any, rotates in the same direction as the first rotor. All stages in the compressor, as well as all stages in the turbine, are alternating in the direction of rotation and, therefore, the stages of the outer rotor interleave, or intermesh, the stages of the succeeding rotor, this intermeshing being carried out throughout the entire power plant up to and including the very last rotor. One additional version of the power plant is disclosed in which the combustion chamber is stationary. A power plant is also disclosed in which the two compressors are provided with a vector-adjusting stage.

The contra-rotating principle enables one roughly to quadruple the compression ratio in the compressor as compared to a single rotation compressor and it also enables one to decrease the number of stages necessary in the contra-rotatable turbine with the overall results being high thermodynamic efficiency and low specific weight and volume of the power plant.

The disclosed bypass engines are also applicable to the helicopters of that type in which the helicopter rotor has jet nozzles at the tips of the rotors. In such application, the propulsive efficiency is also the highest when hot gases and compressed air from the bypass compressor are combined, or mixed, in the rotor ducts and then used in the rotor jets.

It is, therefore, an object of this invention to provide a jet bypass power plant in which the main compressor is a centripetal flow compressor, the turbine is a centrifugal flow turbine, and the bypass compressor includes centripetal flow as well as centrifugal flow portions.

It is an additional object of this invention to provide a bypass engine of the above type which includes at least two contra-rotatable rotors.

It is still another object of this invention to provide a jet power plant of the above type which includes at least three rotors, these rotors including a centripetal flow main compressor, a bypass compressor which includes the centripetal flow portion as well as the centrifugal flow portion, and a centrifugal flow turbine for operating the two compressors.

Still another object of this inveniton is to provide a bypass power plant including a centripetal flow compressor lying in a first transverse plane, a centrifugal flow turbine lying in a second transverse plane, the two planes being perpendicular to the axis of rotation of the power plant, and a combustion chamber as well as the bypass compressor positioned between the above first and second transverse planes.

Still another object of this invetnion is to provide a bypass power plant of the above type in which the combustion chamber is an air-cooled toroidal combustion chamber mechanically integrated into the innermost rotor and rotatable with the innermost rotor, and the main compressor has a plurality of rotors, compression stages and turbine stages within each rotor, the loading of the respective compression and turbine stages being proportioned so as to produce equal peripheral velocities in the outer compression stages of each respective rotor.

Yet another object of this invention is to provide a power plant of the above type in which the combustion chamber is located in the geometric center of the entire power plant and the chamber is a stationary chamber which is surrounded by the rotors of the power plant.

The novel features which are believed to be characteristic of this invention will be better understood from the following description given in connection with the accompanying drawings illustrating several embodiments of the invention.

Referring to the drawings.

Figure 1:
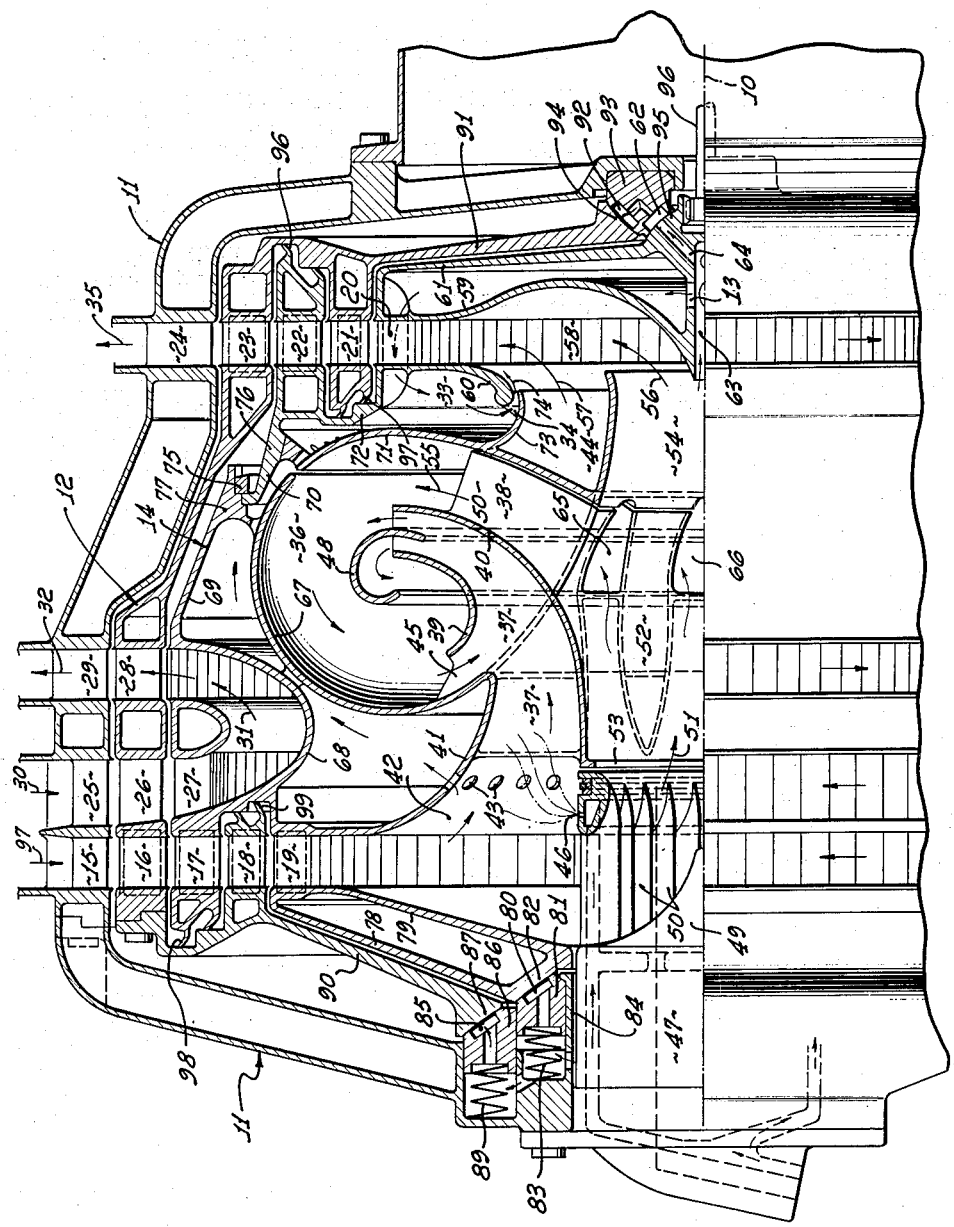
FIGS. 1 and 2 are axial, longitudinal sections of one-half of two power plants having two and three rotors, respectively.

Referring to FIG. 1, it discloses an axial sectional view of the plant, with the axis of the plant being indicated by a dotted line 10 and the plane bisecting the plant passing through this axis. Only one-half of the power plant is being bisected, while the remaining portion of the power plant shows only the external housing, or frame, of the power plant.

The power plant includes an outer housing 11, which preferably is made of sheet metal for obtaining maximum rigidity with minimum weight. There are two rotatable parts in the entire power plant. The first part includes an external, or the first, rotor 12, and the second rotatable part includes the second, or the inner, rotor 14. The main compressor stages include a stator 15 and compression stages 16, 17, 18 and 19. The compressor stages 16 and 18 are integral parts of the external rotor 12 while the stages 17 and 19 are integral parts of the second rotor 14. The stages 16 and 18 are made to rotate in one direction by the turbine stages 21 and 23, while the compressor stages 17 and 19 are made to rotate in the opposite direction by the turbine stages 20 and 22. The turbine is also provided with an expansion stator 24 of the type disclosed in the co-pending application, Serial No. 513,947, filed June 8, 1955. The bypass compressor includes a stator 25, centripetal flow contra-rotatable compressor stages 26 and 27, a centrifugal flow compression stage 28, and a second stator 29. The direction of flow of gases through the entire engine is indicated by the arrows throughout the engine. This flow through the bypass compressor is indicated by arrows 30, 31 and 32. The compressed air leaving the bypass compressor, which is indicated by arrow 32, is later combined with hot gases leaving the turbine's stator 24, this flow of gases being indicated by an arrow 35. The compressed air and heated gases are mixed in a jet pipe (not shown) in the known manner, and are then used to furnish the jet propulsive power for propelling aircraft.

A combustion chamber 36 is a toroidal combustion chamber which has a plurality of input ducts 37 and 38 which are uniformly distributed around the circumference of the toroid. Duct 37 includes walls 39 and 40, which may be considered as a single, continuous wall. The same is also true of the walls 41 and 42 which define the input duct 37 of the chamber. Wall 42 has a plurality of orifices 43 uniformly distributed around the entire circumference of the input duct 37. Wall 42 thus represents a converging cone-shaped input duct 42 which may be considered as one of the main inputs into the combustion chamber. Duct 42 then branches into a plurality of ducts 37 which emanate from duct 42 as, at first horizontal, and then curved, spouts, or ducts 37, which are circumferentially spaced from each other so as to provide room for the exhaust, or the exit, ducts 44 which are also uniformly distributed around the circumference of the toroid and occupy that space which represents the circumferential spacing between the ducts 37 and 38. Accordingly, ducts 37—38 represent one circumferential sector which is followed immediately by the adjacent or next sector 44, the input ducts 37—38 acting at the same time as common side walls for the exhaust duct 44. Accordingly, the input ducts alternate with the output ducts. The input duct 37 is also provided with an input duct 45 which introduces some of the hot gases into duct 37 and mixes these hot gases with the burning fuel, the fuel being introduced into duct 37 by means of a plurality of fuel nozzles 46 which are uniformly distributed around the periphery of the centrally located stationary hollow cylindrical member 47. The chamber is also provided with a central semi-circular ring 48 for directing the flow of air leaving duct 37. The central member 47 is provided with a flow directing, curved, conically shaped member 49 and a plurality of flow directing blades 50 which direct the flow of compressed air in the manner indicated by an arrow 51. Arrow 51 indicates that part of the compressed air which enters an axially positioned rotatable duct 52. Duct 52 is provided with a plurality of openings 65, 66, etc., which represent the entries into the air ducts 38. As mentioned previously, there is a plurality of such ducts 38 which are uniformly distributed around the circumference of the chamber, and the openings 65 and 66 illustrate two succeeding ducts similar to that of duct 38. Duct 52 on its input side receives compressed air indicated by an arrow 51 through an open portion 53, and on the output, or discharge side, it includes a plurality of ducts 38 and a single central duct 54. Ducts 38 convey compressed air into chamber 36 in the manner indicated by an arrow 55 while duct 54 conveys compressed air directly into the turbine in the manner indicated by an arrow 56. The hot gases leave combustion chamber 36 in the manner indicated by an arrow 57. The compressed air 56 and hot gases 57 then are intermixed in the plenum chamber 58. This latter chamber is defined, in the main, by two circular walls 59 and 60 and also the blades of the first, or the input, stage 20 of the turbine. This chamber is wide open on the left side to receive hot gases and air from the ducts 44 and 54. It is to be noted that compressed air leaving duct 54 also acts as a cooling medium for wall 59 of the plenum chamber. Wall 59, in combination with the external wall 61, constitute a hollow side disk which is used for supporting one side of the second rotor 14 by means of an air bearing 62—95 which is connected to duct 54 through a central, hollow, cylindrical recess 63 and a plurality of ducts, or vents, 64 which furnish compressed air to the air bearing 62. The hollow side disk 59—61, and especially its central cylindrical recess 63, is also provided with a plurality of orifices 13 which are uniformly distributed around the circumference of the cylindrical recess. These orifices supply compressed air into the hollow disk from where this air flows through the hollow blades of the first turbine stage 20. After emerging from the turbine blades 20, the compressed air enters the plenum chamber 33 and it then leaves this chamber through a ring-shaped opening 34 defined by the walls 60 and 73, which are spaced from each other.

The compressed air entering orifices 43 is used for cooling the inner wall 67 of the combustion chamber 36. It flows through a duct which is defined by a toroidal wall member 67, which represents the inner wall member of the toroidal chamber, the wall member 41, and an outer wall of the chamber, including wall members 68, 69, 70, 71, 72, 60 and 73, the latter two members constituting a circular ring-shaped outlet duct which discharges the air entering this composite duct into the plenum chamber 58, as indicated by an arrow 74. This air flow also acts as a low temperature boundary layer for cooling wall 60.

The second, or the inner, rotor 14 comprises two rotatable members which are mechanically integrated into a single rotor by means of a joint, which includes a ring 75 and matching portions 76 and 77 of the right and left sides of the rotor. The left side of the rotor is supported by means of a hollow disk including walls 78 and 79 and an air bearing 80 which includes a stator 81 and a rotor 82. Stator 81 is held against rotor 82 by means of a spring 83. Air is supplied to this air bearing by the compressor through a circular opening 84 existing between the central member 47 and the frame member 11. The same is also true of the air bearing 85 which also includes a stator 86 and a rotor 87 and a spring 89. This bearing is used for supporting the left side disk 90 of the outer, or the first, rotor 12. The right side disk 91 is supported by an air bearing 92 which includes a stator 93 and two rotors 94 and 95, rotor 94 being mechanically connected to the side disk 91 while rotor 95 is mechanically connected to the composite hollow side disk 59—61 of the second rotor. The illustrated bearings are of the aerostatic type and are described more in detail in the co-pending application Serial No. 759,626, filed September 8, 1958, titled "Aerostatic Bearings With Fluid Dynamic Seals," now Patent No. 2,916,332, issued December 8, 1959. The second rotor is provided with an outgoing shaft 96 which is used for driving the accessories of the power plant.

It is to be understood that the power plant is provided with proper seals; some of these seals are illustrated in the drawings in a schematic manner, such as seals at 96 through 99. Seals of this type are known and need no additional description.

The operation of this power plant could be summarized only very briefly in the light of the already given description. Ambient air enters the two compressors in the manner indicated by the arrows 97 and 30. In the second, or the bypass, compressor, the air follows first the centripetal part and then the centrifugal part of the compressor, whereupon it leaves the latter in the direction indicated by arrow 32. The air entering the main compressor through stator 15, is compressed in the contra-rotatable stages 16—19 and it then enters the toroidal chamber through a flow-accelerating funnel-shaped duct 42 and a plurality of ducts 37, which convey one portion of the compressed air into the central portion of toroid 36. The remaining portion of the compressed air enters duct 52 and a minor portion flows through orifices 43 through the composite duct surrounding wall 67 of the chamber. That air which enters duct 52 divides into two main flows. One flow, illustrated by arrow 56, discharges into the plenum chamber 58 while the remaining portion enters a plurality of ducts 38 which convey this portion into the toroidal chamber. Hot gases leave the chamber through a ring-shaped discharge duct 44 which conveys these hot gases into the plenum chamber 58. The compressed air and hot gases are mixed in the plenum chamber and are then partially expanded and discharged as hot compressed gases into the jet pipe, as indicated by an arrow 35. These gases are mixed with the compressed air leaving the bypass compressor and are then used for producing the jet power.

The static pressure of compressed air leaving the bypass compressor, as a rule, is higher than the static pressure of hot gases leaving the turbine; the difference in the two static pressures is equal to the losses taking place in the ducts and jet pipe. In this manner, the bypass compressor supplies the above losses. Therefore, the compressed air leaving the bypass compressor also acts as a suction siphon, or the low pressure venturi pump, in the ducts and the jet pipe with respect to the gases leaving the turbine. The ducting arrangement and the jet pipe are not illustrated in the drawings because they are known to the art.

Before proceeding with the description of the remaining figures, it should be pointed out that the loading of the turbine stages 20 through 23 and of the compression stages 16 through 19 and 26 through 28 is proportioned so as to make the velocities of the outer peripheries of the compression stages 16 and 17 equal to each other in absolute magnitudes, and opposite in direction. This velocity relationship maintains itself throughout the operating range of the power plant. The above stage loading is obtained by computing the power which is required by the compresison stages operating in the above manner and then proportioning, or designing, the corresponding turbine stages so as to supply this required power at the design point. The desired relative velocity relationship between the rotors then approximately maintains itself throughout the operating range of the power plant because of the proportional increases and decreases in $\Delta H_c$'s and $\Delta H_t$'s, which are the heat changes in the compressor stages and the turbine stages. The advantage of the above type of operation of the stages resides in the fact that the inner stages of the compressor, such as stages 18 and 19, can perform power conversions which are either equal to or approach the power conversion of the outermost stage 16, and in this manner increase the compression ratio and the thermodynamic efficiency of the compressor. Such power conversion would be diminishing quite rapidly in a compressor in which the velocities of the compressor stages would diminish toward the axis of rotation as a function of their respective radii. For example, this is the case in a single rotor centripetal flow compressor in which all stages are connected to a single rotatable side disk; in such a case the peripheral velocities of the stages diminish in proportion to their radial distances and, therefore, their power conversions also diminish in proportion to their radial distances from the axis of rotation. The above also may be restated by stating that in the compressor of the above type (single rotatable disk with a plurality of compression stages mechanically connected to the disk), the stages operate at the rapidly decreasing Mach number, the decrease being proportional to the decrease in the peripheral speed. In the compressors disclosed in FIGS. 1 through 4 here, the Mach number remains substantially constant throughout the entire compressor because the velocities of all outermost stages of all rotors are made equal in their absolute magnitudes. Constant local Mach number operation of the main compressor is also obtained by using one or more vector-adjusting stages. A compressor of this type is illustrated in FIG. 4 and will be described later.

Figure 2:
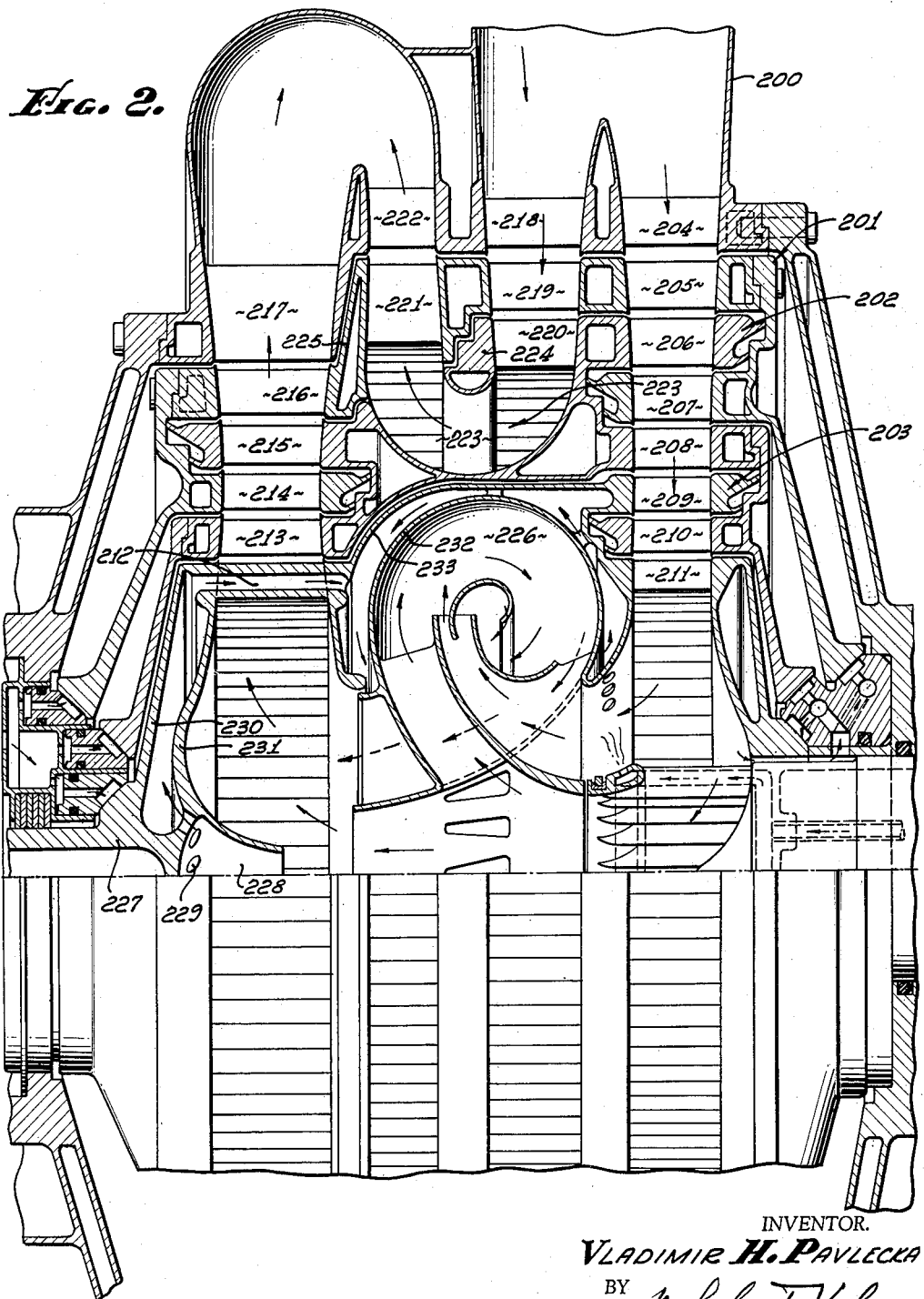

FIG. 2 discloses the same type of power plant as that in FIG. 1 but with a larger number of rotors and stages in the main compressor and turbine. No detailed description of this power plant is required since the basic principles of its geometry are identical to that used in connection with FIG. 1. Stationary frame 200 houses three rotors 201, 202 and 203. The outer rotor 201 includes the following stages: the first and the third rotatable centripetal flow compressor stages 205 and 207 of the main compressor, the first and the third rotatable stages 219 and 221 of the bypass compressor, and the third and the fifth stages 214 and 216 of the turbine. The main compressor includes seven contra-rotatable compression stages 205 through 211 which are preceded by a stator 204. The bypass compressor includes two stators 218 and 222 and three rotatable compression stages 219, 220 and 221. Stages 219 and 220 are centripetal flow stages and stage 221 is a centrifugal flow stage. The bypass compressor can be readily provided with any desired number of stages, as one can very readily see from its geometry. For instance, stage 220 can be extended beyond ring 224 into the plenum chamber 223 so as to be directly under stage 221 in which case the bypass compressor will become a four-contra-rotatable-stages compressor. An additional stage or two stages can be added by mounting them on a ring 225 of the outer rotor. In this case, then the compressor will become a six-stage compressor. A larger or smaller number of stages can be used in the bypass compressor, depending upon the compression ratio of the main compressor (including stages 205 through 211) and the heat drop $\Delta H_t$ which will take place in the centrifugal flow turbine. The combustion chamber 226 is identical to that used in FIG. 1 and, therefore, needs no additional description.

As in FIG. 1, the first turbine stage is an air-cooled stage, which is accomplished as follows: an input spout, or a hollow cylindrical recess 228, with a plurality of orifices 229 conveys compressed air into the hollow disk formed by the side wall members 230 and 231. Compressed air then enters the hollow blades 212 of the first input stage 212 and then enters the inter-wall space between the inner wall 232 and the outer wall 233 of combustion chamber.

The peripheral velocities distribution among the three rotors 201, 202 and 203 is the same as that used in connection with FIG. 1: the peripheral velocities of the stages 205, 206 and 209 are equal. Rotors 201 and 203 rotate in the same direction and rotor 202 rotates in the opposite direction. With this velocity relationship, the main compressor is a substantially constant local Mach number compressor from the first to the last stage. For a more detailed description of the constant local Mach number methods of operating centripetal compressors, reference is made to the co-pending application Serial No. 514,001, filed June 8, 1955, now abandoned, and entitled "Methods of Compressing Fluids With Centripetal Compressors," which is made a part of this disclosure.

Figure 3:
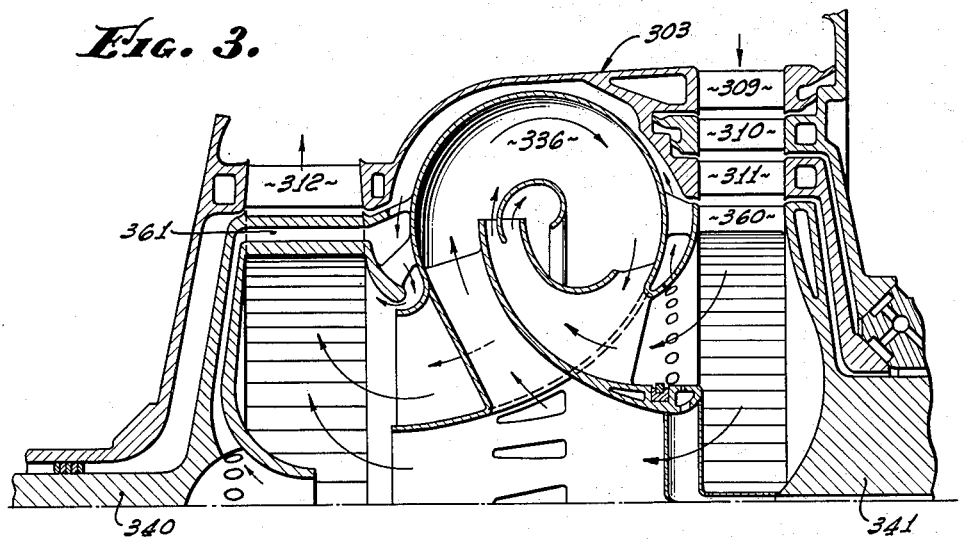
FIG. 3 is an axial, longitudinal section of one-half of a stationary combustion chamber and a portion of the adjoining rotor.
Figure 4:
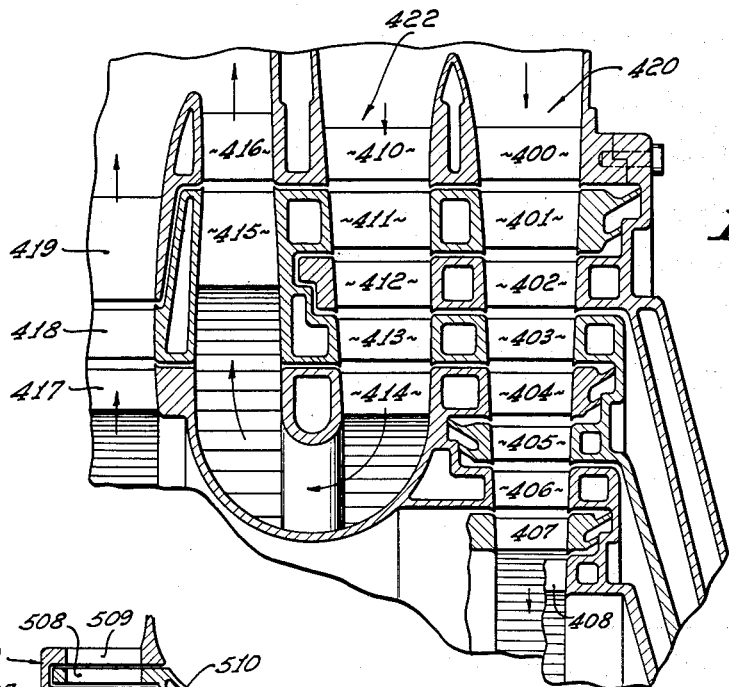
FIG. 4 is a sectional view of the upper portion of the bypass compressor and of the adjoining portion of the main compressor with a vector-adjusting stage.

FIG. 3 illustrates the same type of engine that is illustrated in FIG. 2 except that the combustion chamber 336 now has been made stationary, while it is rotatable in FIG. 2 since it constitutes an integral part of the innermost rotor 203. The innermost rotor in FIG. 3 is illustrated at 303 and it corresponds to the inner rotor illustrated in FIG. 2 except that the combustion chamber now has been separated from this rotor. Stage 209 in FIG. 2, therefore, corresponds to stage 309 in FIG. 3, and stages 210 and 211 correspond to stages 310 and 311. The same is also true of the turbine stage 212 which now is numbered as stage 312. Since chamber 336 now is stationary and is supported by the stationary members 340 and 341, it becomes necessary to provide an input diffusion stator 360 on the compressor side and an air-cooled output expansion stator 361 on the turbine side of the chamber. Stator 360 becomes necessary in order to take the swirl out of the compressed air leaving the compressor stage 311 while stage 361 is necessary for accelerating the gases leaving chamber 336, and also for imparting the proper direction of flow for these gases. The compressor and turbine stators of the types illustrated at 360 and 361 are described more in detail in the previously mentioned co-pending application Serial No. 514,001, and, therefore, need no additional description here.

FIG. 3 has very important merits, such as a considerably lighter weight of the inner rotor with the result that it is capable of responding more readily to the desired accelerations and decelerations of the power plant. Also, it is quite feasible to obtain a complete dynamic balance among a plurality of rotors that may be used in connection with FIG. 3 since the weight of the combustion chamber now need not be entered into the dynamic balancing of the rotors. The turbine stator 361 may be a supersonic stator, as described in application S.N. 514,001, and such stator enables one to reduce the number of turbine stages.

FIG. 4 illustrates an additional modification of FIG. 2. The power plant illustrated in FIG. 4 is identical to that illustrated in FIG. 2 except that it is now provided with stator stages 402 and 412 which are the respective vector-adjusting stages for the main compressor 420 and for the auxiliary compressor 422. The order of the stages in the main compressor 420 is as follows: input stator 400, the first compression stage 401, the vector-adjusting stage 402, the second compression stage 403, and the third, fourth, fifth, sixth and seventh compression stages 404 through 408. In the bypass compressor 422, there is an input stator 410, the first centripetal stage 411, the vector-adjusting stage 412, the second and third centripetal flow compression stages 413 and 414, the centrifugal flow stage 415 and an output stator 416. Accordingly, the number of stages in the main compressor has been increased from seven stages in FIG. 2 to eight rotatable compression stages in FIG. 4. The number of stages in the bypass compressor now has been increased to four rotatable stages, and both compressors have been provided with the vector-adjusting stages. The advantages obtainable with the vector-adjusting stages are fully described in the previously mentioned co-pending application, Serial No. 514,001, and, therefore, need not be repeated here. Suffice it to say that it becomes possible to obtain a constant Mach number operation of all compression stages with the aid of the vector-adjusting stage, and also use high Mach number operation in all stages without encountering strictly supersonic mode of operation of the compression stages.

Figure 5:
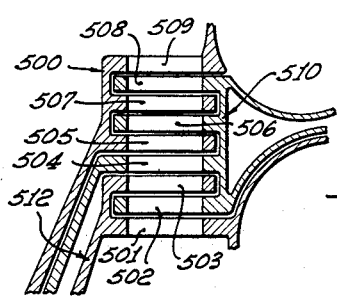
FIG. 5 illustrates a simplified schematic diagram of a centrifugal flow turbine having a plurality of rotors, each rotor having a plurality of stages.

FIG. 5 illustrates a schematic diagram of a turbine in which the first rotor 500 has three turbine stages 505, 507 and 509; the second rotor 510 has four turbine stages 502, 504, 506 and 508, and the third rotor 512 has two turbine stages 501 and 503. Therefore, the turbine has three rotors 500, 510 and 512 and a total of nine rotatable stages 501 through 509. In practice, the turbine hardly ever will need so many stages.

FIGS. 4 and 5 illustrate the fact that the disclosed geometry of the compressor and turbine stages is such that it is possible to increase the number of stages in the two compressors and in the turbine to a reasonably high number of stages, the limit to the increase being the desired total compression head obtained in the compressor and the limits imposed on maximum outer diameter of the power plant, which limits the total number of stages that can be included in such outer diameter.

The advantages of the disclosed power plants are high total compression head, high propulsive efficiency, very low specific volume and specific weight, the use of inexpensive steels, simplicity and compactness of structure, and low original cost. The reduction in the specific weight and volumes is a very marked reduction. For example, for a 15,000 pound thrust jet engine, the best that it has been possible to obtain thus far (1958) with the axial compressors is .25 pound per pound of thrust and 20 cubic inches per pound of thrust (De Havilland Gyron engine). The specific weight and volume of the disclosed power plant is .06 pound per pound of thrust and 7 cubic inches per pound of thrust. With the weight and volume of the engines reduced in the above manner, and their maximum peripheral velocity being only 700 feet per second (vs. 1,400 feet per second for axial flow power plants), it becomes entirely feasible and safe to mount such engines in the wings or fuselage of jet-propelled aircraft with still additional advantages: the drag of such aircraft is reduced by approximately twenty-five percent (25%) as compared to the drag of an aircraft with axial flow power plants mounted in pods (DC8; B707, etc.) and suspended from wings.

What is claimed as new is:

1. A bypass gas turbine engine comprising a centrally positioned combustion chamber, a centripetal flow multi-stage main, or primary flow, compressor positioned to one, or the input, side of the chamber, a centrifugal flow multi-stage turbine positioned adjacent to the opposite, or the output, side of said chamber, the compressor and turbine stages being mechanically integrated into a plurality of contrarotatable rotors surrounding said chamber, and a multi-stage bypass, or secondary flow, compressor also having a plurality of contrarotatable compression stages positioned between said main compressor and said turbine, said engine including a first, or the outer, rotor; a second, or inner, rotor following in the centripetal direction the first rotor; said first rotor including a plurality of the main compressor stages, a plurality of the bypass compressor stages, and a plurality of turbine stages; said second rotor including a plurality of the main compressor stages, a plurality of the turbine stages and at least one bypass compressor stage.

2. The engine as defined in claim 1 which includes first, second and third rotors, said first rotor being the outer rotor, said third rotor being the inner rotor and said second rotor being the intermediate rotor positioned between the first and the third rotors, said first rotor including at least the first and the third main compressor stages, the first and the last compression stages of the bypass compressor and at least the last and the antepenultimate stages of the turbine.

3. The engine as defined in claim 2 in which the second rotor includes the second, the fourth and the sixth compression stages of the main compressor, at least the second stage of the bypass compressor, and at least the second and the fourth stages of the turbine.

4. The engine as defined in claim 3 in which the third rotor includes the fifth and the seventh stages of the main compressor and at least the first stage of the turbine.

5. A bypass gas turbine engine comprising a main centripetal flow compressor, a centrifugal flow turbine, and a bypass compressor including a centripetal flow portion and a centrifugal flow portion, said turbine driving said main and bypass compressors.

6. The engine as claimed in claim 5 which includes first, second and third concentric rotors, said rotors being numbered in the centripetal direction, each rotor having at least two main compressor stages and at least one turbine stage; said first rotor also having at least one centripetal flow compression stage and one centrifugal flow compression stage for said bypass compressor, and said second rotor having at least one centripetal flow compression stage for said bypass compressor.

7. The engine as defined in claim 5 in which said bypass compressor includes a plurality of centripetal flow compression stages and at least one centrifugal flow stage.

8. The engine as defined in claim 6 in which said third rotor also includes a rotatable combustion chamber.

9. The engine as defined in claim 6 which also includes a stationary toroidal combustion chamber positioned at the geometric center of said engine.

10. The engine as defined in claim 6 which also includes air bearings for each rotor, each of said air bearings being fluid-dynamically connected to compressed air produced by said main compressor.

11. A bypass gas turbine power plant comprising a plurality of concentric rotors including a centripetal flow main compressor, a centripetal and centrifugal flows bypass compressor, a centrifugal flow turbine, and a centrally and axially positioned combustion chamber, each rotor having a plurality of centripetal flow compression stages of said main compressor, each rotor having its respective outer stage having a greater radius than any other stage within the respective rotor, each rotor also including at least one turbine stage, the loading of said turbine and compression stages being proportioned to maintain equal peripheral speeds of said outer stages.

References Cited in the file of this patent
UNITED STATES PATENTS

| | | |
|---|---|---|
| 2,078,956 | Lysholm | May 4, 1937 |
| 2,361,726 | Weimar | Oct. 31, 1944 |
| 2,391,779 | Griffith | Dec. 25, 1945 |
| 2,416,389 | Heppner et al. | Feb. 25, 1947 |
| 2,471,892 | Price | May 31, 1949 |
| 2,611,532 | Ljungstrom | Sept. 23, 1952 |
| 2,626,501 | Pavlecka et al. | Jan. 27, 1953 |
| 2,804,747 | Pavlecka | Sept. 3, 1957 |